Nov. 20, 1956     J. H. MITCHELL     2,771,316

AUTOMATIC RELEASING HOOK

Filed Nov. 16, 1953

John H. Mitchell
INVENTOR.

BY *Thomas A. O'Brien*
*and Harvey B. Jacobson*
Attorneys

2,771,316

AUTOMATIC RELEASING HOOK

John H. Mitchell, Montesano, Wash.

Application November 16, 1953, Serial No. 392,277

5 Claims. (Cl. 294—83)

This invention relates to an automatic releasing hook especially adapted for use with hoisting apparatus.

The primary object of this invention resides in the provision of means for automatically releasing a sling and load which have previously been hoisted by the novel automatic releasing hook so as to thereby reduce the time, effort, labor and accidents which may be involved in material handling.

The construction of this invention features an automatic releasing hook having dual hooks which are pivotally mounted in a frame and which are adapted to pass between sling lifters which will automatically remove the load from the hook.

Still further objects and features of this invention reside in the provision of an automatic releasing hook provided with a snap action mechanism, which automatic releasing hook is strong and durable, simple in construction and manufacture, capable of being readily utilized in most cases where existing hooks have been heretofore used, and which is relatively inexpensive to manufacture, thereby permitting wide distribution.

Additionally, features of this invention make it possible to hoist and transfer safely and positively automatically release material or objects and a sling or similar rigging, where existing hooking devices would prove unsatisfactory or fail completely.

Figure 1:
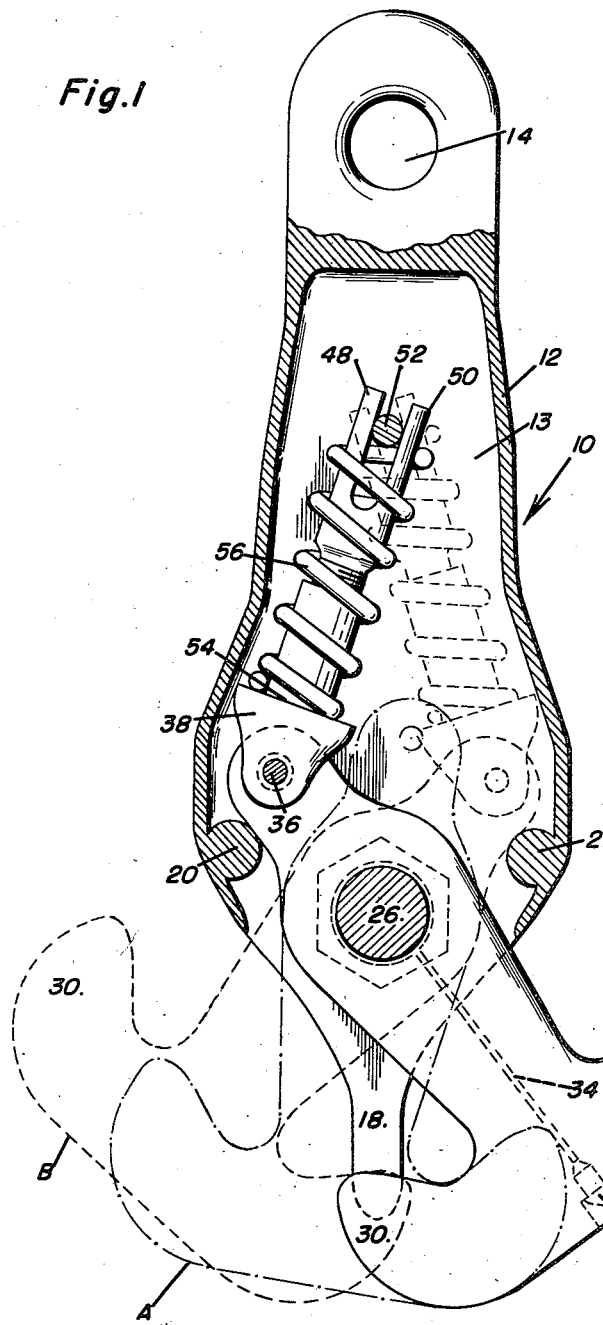
Figure 2:
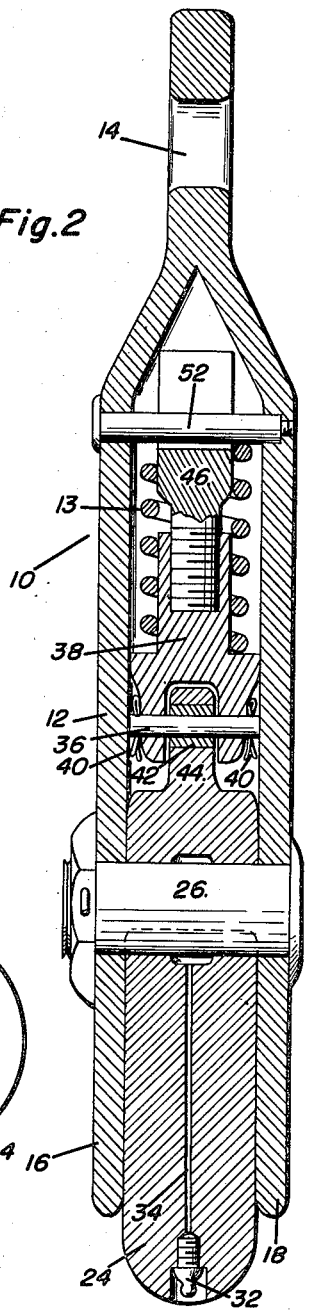

These, together with the various ancillary objects and features of the invention which will become apparent as the following description proceeds, are attained by this automatic releasing hook, a preferred embodiment of which has been illustrated in the accompanying drawings, by way of example only, wherein:

Figure 1 is a front elevational view of the automatic releasing hook with parts thereof being broken away to show other parts in greater detail; and Figure 2 is a vertical sectional view of this automatic releasing hook.

With continuing reference to the accompanying drawings wherein like reference numerals designate similar parts throughout the various views, reference numeral 10 generally designates the automatic releasing hook comprising the present invention, which includes a frame 12 provided with an eye 14 to which a cable may be secured. The frame 12 is provided with a central hollow as at 13, and at the lower extremity thereof is provided with bifurcated elements forming sling lifters as at 16 and 18. Integrally cast with the frame 12 or otherwise attached thereto are cylindrical stop members 20 and 22.

A hook member 24 is mounted on a shaft 26 extending between the bifuricated sling lifters 16 and 18, the hook member 24 including dual hooks 28 and 30 which are opposed to each other. A Zirk fitting 32 is provided for the hook members 24 so as to lubricate the shaft 26 through a passage 34.

By means of a rod or shaft 36, the bifurcated end of a piston 38 is piovtally attached to the hook member 24, cotter pins, as at 40, being used to hold the piston 38 in position. A bearing insert, as at 42, may be provided in the reduced portion 44 of the hook member 24 to reduce wear. The piston 38 is provided with an end portion 46 which is split as at 48 and 50 so as to receive a stop element in the form of a pin 52 therebetween. The pin 52 is suitably mounted in the frame 12. The piston 38 is formed with a shoulder, as at 54, and a coil spring 56 extends between the shoulder 54 and the pin 52 and yieldingly engages the shoulder 54 and the pin 52 so as to urge the piston 38 either to the position as is shown in solid lines, or, alternatively, to the position as is shown in dotted lines in Figure 1. At these positions, the spring 56 is under least compression and hence, any intermediate position is an unstable position. At the positions indicated by solid lines and by dotted lines in Figure 1, the hook member 24 engages, respectively, the stop members 20 and 22. These stop members limit and determine the respective positions.

The operation of this device is comparatively simple. After a sling has been placed on the hook 28, the hoist, crane or other means for lifting the load places a strain upon the hook which then pivots the hook to the position as is shown in dotted lines and designated by letter A. This relative position will be maintained until the load on the hook has been substantially decreased. It is to be noted that in the position A, the hook 24 is approximately 10° past the dead center position, due to the fact that the hook 28 is offset from the center of the shaft 26 and the load will tend to suspend itself directly below the shaft 26 which is in vertical alignment with the eye 14 to which the hoisting cable is attached. Then, as soon as the load is released, the hook will move to the position as indicated in dotted lines and as at letter B, causing the sling lifters 16 and 18 to lift the sling off the hook 28, leaving the device ready to receive a load on the hook 30. It is to be realized that the spring 56 causes this snap action.

Since from the foregoing, the construction and advantages of this automatic releasing hook are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. An automatic releasing mechanism for hoisting comprising a hollow frame, a hook member pivotally secured to said frame, said frame including a pair of sling lifters extending on either side of said hook, stop members in said frame, and resilient snap action means for urging said hook against a selected one of said stop members, said snap action means including a piston pivotally attached to said hook member, a stop element attached to said frame, said piston having a shoulder, and resilient means yieldably engaging and extending between said shoulder and said stop element.

2. An automatic releasing mechanism for hoisting comprising a hollow frame, a hook member pivotally secured to said frame, said frame including a pair of sling lifters extending on either side of said hook, stop members in said frame, and resilient snap action means for urging said hook against a selected one of said stop members, said snap action means including a piston pivotally attached to said hook member, a stop element attached to said frame, said piston having a shoulder, and resilient means yieldingly engaging and extending between said shoulder and said stop element, said resilient means comprising a coil spring concentrically emplaced about said piston.

3. An automatic releasing mechanism for hoisting comprising a hollow frame, a hook member pivotally secured to said frame, said frame including a pair of sling lifters extending on either side of said hook, stop members in said frame, and resilient snap action means for urging said hook against a selected one of said stop members, said snap action means including a piston pivotally attached to said hook member, a stop element attached to said frame, said piston having a shoulder, and resilient means yieldingly engaging and extending between said shoulder and said stop element, said stop element comprising a pin, said piston having a split end provided with opposed portions receiving said pin therebetween.

4. An automatic releasing mechanism for hoisting comprising a hollow frame, a hook member pivotally secured to said frame, said frame including a pair of sling lifters extending on either side of said hook, stop members in said frame, and resilient snap action means for urging said hook against a selected one of said stop members, said snap action means including a piston pivotally attached to said hook member, a stop element attached to said frame, said piston having a shoulder, and resilient means yieldingly engaging and extending between said shoulder and said stop element, said resilient means comprising a coil spring concentrically emplaced about said piston, said stop element comprising a pin, said piston having a split end provided with opposed portions receiving said pin therebetween.

5. An automatic releasing mechanism for hoisting comprising a hollow frame, a hook member pivotally secured to said frame, said frame including a pair of sling lifters extending on either side of said hook, stop members in said frame, and resilient snap action means for urging said hook against a selected one of said stop members, said snap action means including a piston pivotally attached to said hook member, a stop element attached to said frame, said piston having a shoulder, and resilient means yieldingly engaging and extending between said shoulder and said stop element, said resilient means comprising a coil spring concentrically emplaced about said piston, said stop element comprising a pin, said piston having a split end provided with opposed portions receiving said pin therebetween, said hook member comprising integrally formed dual hooks.

References Cited in the file of this patent

UNITED STATES PATENTS

| 905,576 | Porter | Dec. 1, 1908 |

FOREIGN PATENTS

| 73,712 | Switzerland | Nov. 1, 1916 |
| 118,798 | Switzerland | Jan. 17, 1927 |